UNITED STATES PATENT OFFICE.

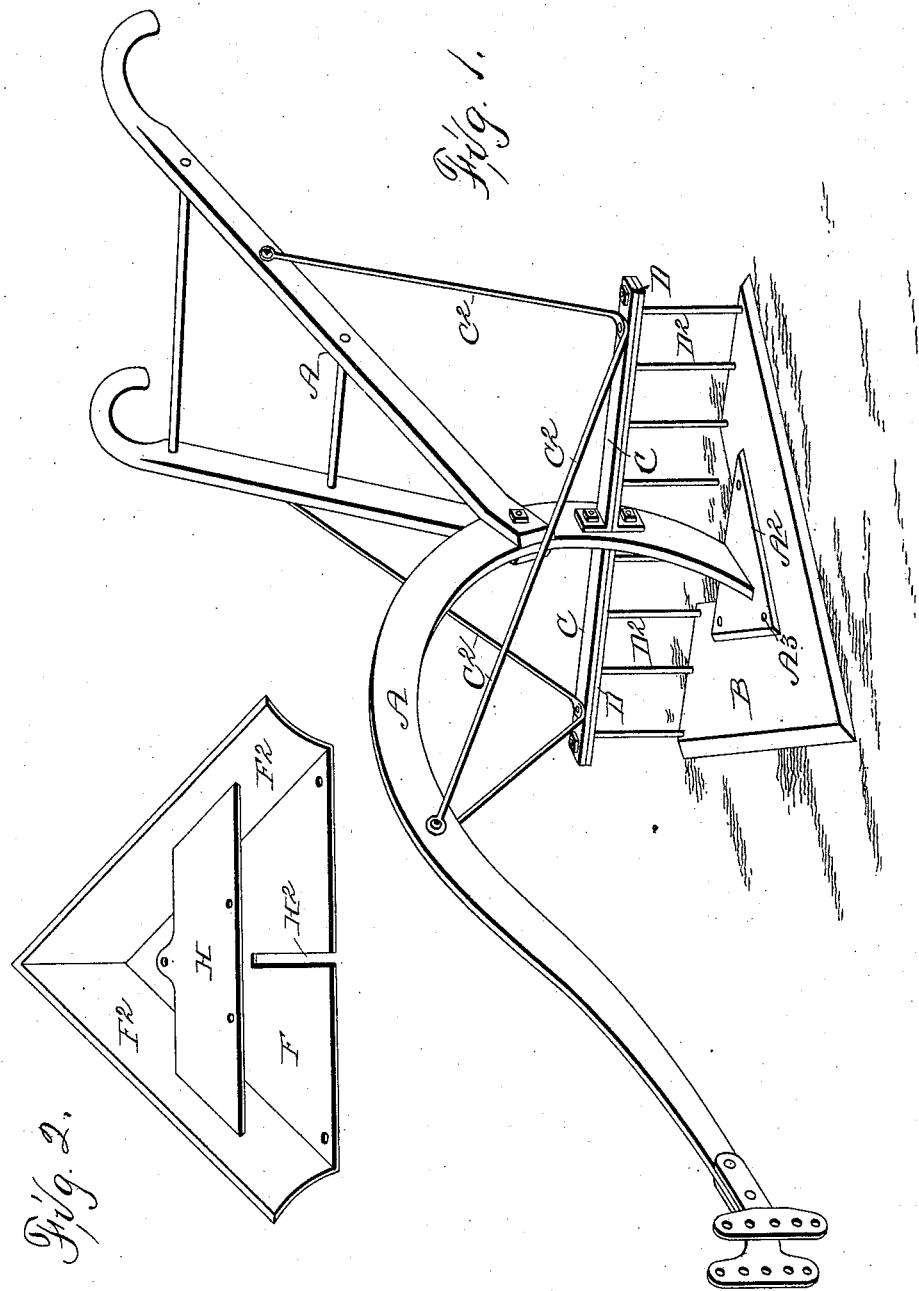

ADOLPH ROESCH, OF WINNEBAGO CITY, MINNESOTA.

WEED-CUTTER AND CULTIVATOR.

SPECIFICATION forming part of Letters Patent No. 576,615, dated February 9, 1897.

Application filed May 1, 1896. Serial No. 589,894. (No model.)

*To all whom it may concern:*

Be it known that I, ADOLPH ROESCH, a citizen of the United States of America, residing at Winnebago City, in the county of Faribault, State of Minnesota, have invented a new and useful Weed-Cutter and Cultivator, of which the following is a specification.

This invention relates to that class of weed-cutters in which a flat plate sharpened on its edges is advanced through the ground directly beneath the surface.

My object is to provide a series of weed-pulling rods at the rear of the plate that will also serve as braces for supporting said cutting-plate and to provide means for supporting said weed-pulling rods from the other parts of the cultivator.

My invention consists in certain details of construction, arrangement, and combination of parts, as hereinafter set forth, pointed out in my claim, and illustrated in the accompanying drawings, in which—

Figure 1 shows the complete device in perspective. Fig. 2 shows an inverted perspective view of the cutter-plate to be used interchangeably with the flat plate to throw the ground laterally in both directions.

Referring to the accompanying drawings, the reference-letter A is used to indicate a cultivator-frame of the usual construction, having the end of the beam curved downwardly and provided with a flattened base $A^2$, perforated to admit bolts or screws $A^3$.

B indicates the flat cutting-plate, made of suitable metal, sharpened on its front edges and substantially triangular in shape. At its central portion it is perforated to admit the bolts or screws $A^3$ and be thereby firmly secured to the end of the beam.

C indicates a brace fixed to and extended laterally from the beam a short distance above its end. Rods $C^2$ are fixed to its ends and attached to the handles and beam to firmly brace all of the parts of the implement.

D D indicate flat bars, each having a number of rods $D^2$ fixed thereto and projecting downwardly therefrom. These bars are secured to the under surface of the brace C, and the lower ends of some of the said rods are preferably secured to the rear end of the plate B.

In practical use the device is advanced through a field between the rows in the ordinary way and held to cut to any depth by means of the handles. The entire cutting-plate passes beneath the surface of the ground and of course severs every stalk growing between the rows. The upright rods at the rear of the plate serve to pull the weeds from the ground and to break up the ground.

When it is desired to throw the ground laterally against the rows, I have provided a modified form of cutting-plate F with its forward edges curved downwardly and forwardly at $F^2$. This plate is secured to the beam end by means of a cross-piece H on its under side connecting the edges thereof and perforated to admit the bolts or screws $A^3$, the top of the plate being slotted at $H^2$ to admit the beam. In other respects the two plates are the same and are operated or used in a similar manner, and either one may be easily and quickly attached to the end of the beam to adapt the device for different kinds of work.

Having thus described my invention, what I claim as new therein, and desire to secure by Letters Patent of the United States therefor, is—

A weed cutting and pulling implement and cultivator, comprising a beam, handles secured thereto, a triangular weed-cutting plate B, detachably secured to the lower end of the beam, two braces C, C, secured to the beam and extended laterally in opposite directions above the rear end of the plate two or more vertical rods $D^2$ fixed to the plate and brace on each side and braces $C^2$ secured to the outer ends of said braces C, and to the beam and handles, substantially as and for the purposes stated.

ADOLPH ROESCH.

Witnesses:
ANDREW C. DUNN,
W. H. HODGMAN.